United States Patent
Raby et al.

(10) Patent No.: US 7,018,074 B2
(45) Date of Patent: Mar. 28, 2006

(54) REFLECTOR MOUNTING ARRANGEMENT AND METHOD AND CLIP FOR MOUNTING A REFLECTOR IN A FLUORESCENT LIGHT FIXTURE

(76) Inventors: Bruce R. Raby, 354 Paisley Circle, Tecumseh, Ontario (CA) N8N 3R1; Fredrick R. Raby, Sr., 354 Paisley Circle, Tecumseh, Ontario (CA) N8N 3R1

( * ) Notice: Subject to any disclaimer, the term of this patent is extended or adjusted under 35 U.S.C. 154(b) by 462 days.

(21) Appl. No.: 10/266,167

(22) Filed: Oct. 7, 2002

(65) Prior Publication Data

US 2004/0066655 A1    Apr. 8, 2004

(51) Int. Cl.
*F21V 7/00* (2006.01)

(52) U.S. Cl. ...................... 362/306; 362/225; 362/260; 362/341

(58) Field of Classification Search ........ 362/145–151, 362/217, 219, 225, 260, 296, 306, 341
See application file for complete search history.

(56) References Cited

U.S. PATENT DOCUMENTS

| 4,814,954 A | * | 3/1989 | Spitz ........................... 362/217 |
| 5,613,761 A | * | 3/1997 | Raby et al. ................. 362/217 |
| 5,658,066 A | * | 8/1997 | Hirsch ........................ 362/219 |
| 5,988,834 A | * | 11/1999 | Latzel ........................ 362/320 |
| 6,186,642 B1 | * | 2/2001 | Corcorran et al. .......... 362/219 |

FOREIGN PATENT DOCUMENTS

| DE | 3937256 A1 | * | 5/1991 |
| JP | 06181001 A | * | 6/1994 |

* cited by examiner

*Primary Examiner*—Stephen Husar
*Assistant Examiner*—Jason Han
(74) *Attorney, Agent, or Firm*—John R. Benefiel

(57) ABSTRACT

A reflector mounting for fluorescent light fixtures in which a rectangular reflector sheet is formed and held in a trough shape by a series of bracket clips hooked to side edges thereof, the bracket clips having a hole receiving the light tube to thereby hold the reflector in the light fixture.

12 Claims, 2 Drawing Sheets

REFLECTOR MOUNTING ARRANGEMENT AND METHOD AND CLIP FOR MOUNTING A REFLECTOR IN A FLUORESCENT LIGHT FIXTURE

BACKGROUND OF THE INVENTION

This invention concerns mounting of reflectors in fluorescent light fixtures. The ability to improve the efficiency of light fixtures has led to adding reflectors above fluorescent light tubes to increase the output of light to save electrical power.

A typical installation comprises fixing a metal reflector to the fixture housing with fasteners, the reflector positioned above the fluorescent tubes in the fixture housing. This is a slow, labor intensive process, requiring removal of the light tubes and working overhead standing on a ladder. For commercial installations such as stores, offices, factories, etc., involving hundreds of fixtures, the cost is substantial.

In U.S. Pat. No. 5,613,761 issued to the present inventors a lightweight reflector using plastic corrugated material with a foil film facing is described. This reflector can be mounted to the tubes themselves, as described in that patent, using cutouts in end pieces of the reflector.

While that mounting and reflector is a considerable improvement over the prior reflectors, the reflector must first be formed into a trough shape by fixing end pieces to the reflector ends, and installation is still time consuming as the formed reflector must be maneuvered properly to secure the same into place on the tubes.

In addition, there is a great variety of sizes of tubes and fixtures in use, and it would be advantageous to provide a standardized mounting to fit most or all such light sizes.

It is the object of the present invention to provide a reflector mounting arrangement and method for fluorescent light fixtures which makes it simple and quick to install a reflector to a variety of light sizes.

SUMMARY OF THE INVENTION

The above object and others which will become apparent upon a reading of the following specification and claims are achieved by a using flat rectangular reflector sheet fitting within the fixture housing, preferably constructed of corrugated plastic with a reflective film on one side which is preformed with a series of pairs of aligned notches on each side edge. A plurality of bracket clips preferably of a generally rounded shape and made from clear plastic sheet stock each have a pair of opposing slots extending into each end of the clip bracket. The slots are spaced and angled to receive a respective reflector side edge when the reflector is formed into an arcuate trough.

The reflector blank has pairs of aligned slots along its length which may each is received in a clip bracket slot to securely position the reflector on a tube, which is received in a central hole in each bracket clip.

The bracket clips may come in different sizes and are formed with a knockout hole to receive different sized light tubes. Inwardly extending tabs partially around the hole and are able to be resiliently bent or twisted to allow the tube to be pushed into the hole past the tab, the tab moving back over the tube to prevent the tube from escaping from the hole.

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Figure 1:
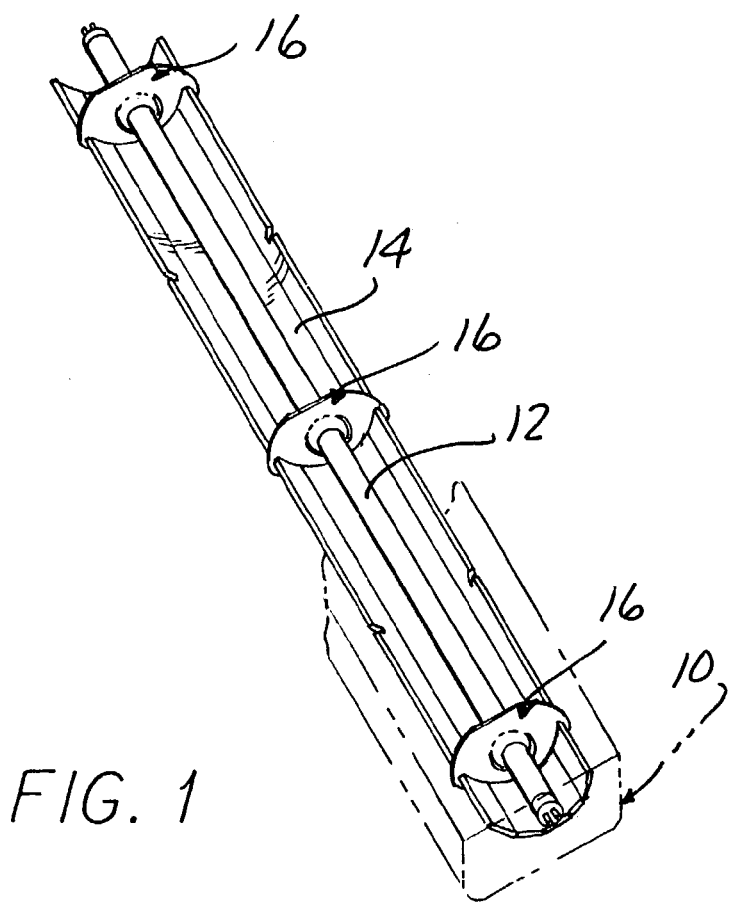
FIG. 1 is a perspective view of an inverted reflector held on a fluorescent light tube with a series of bracket clips which also hold the reflector in a trough shape, a fragmentary portion of the light fixture shown in phantom lines.

Referring to the drawings, the present invention concerns a fluorescent light fixture 10 (FIG. 1) in which one or more fluorescent light tubes 12 are mounted. According to the present invention, a reflector 14 is mounted to the fixture 10 by an arrangement including a series of clip brackets 16 preferably made of a clear plastic sheet material so as to be as unobtrusive as possible and to not obstruct light emanating from the tube 12.

Each bracket clips 16 hold the sides edges of the reflector 14 to form the same in a trough shape and are received on the fluorescent tube 12 to hold the reflector over the tube 12 without any connection to the housing 10.

Figure 2:
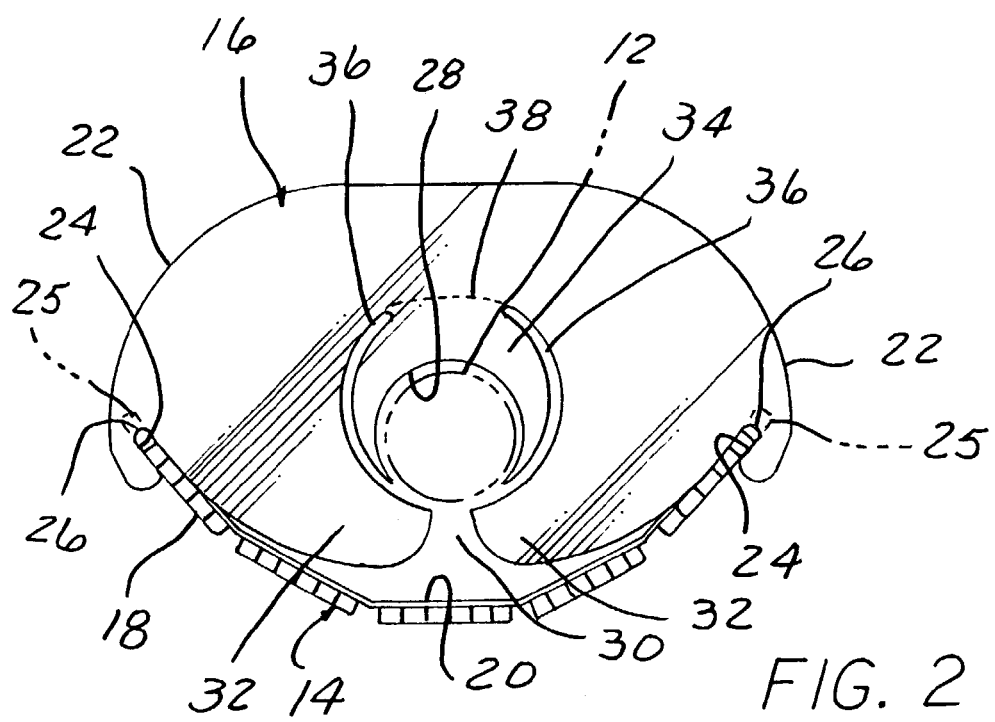
FIG. 2 is an enlarged cross sectional view taken through the inverted reflector of FIG. 1 showing one of the bracket clips in further detail.
Figure 3A:
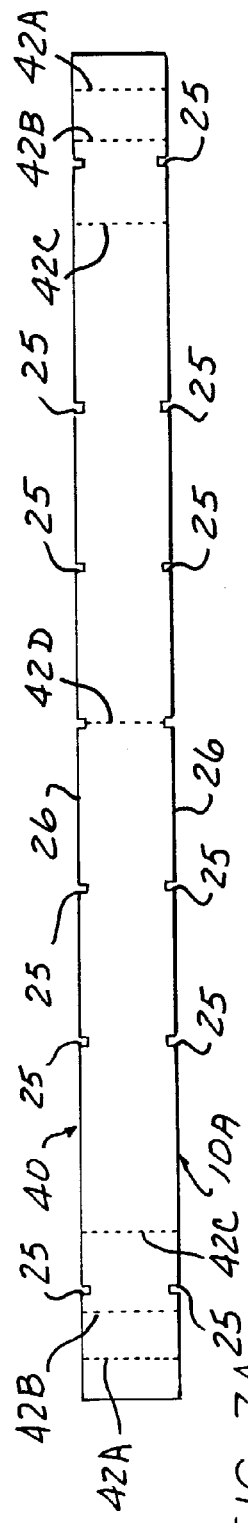
FIGS. 3A–3D show a reflector blank with markings to trim to allow cutting to various length reflectors as indicated in the various views.
Figure 3B:
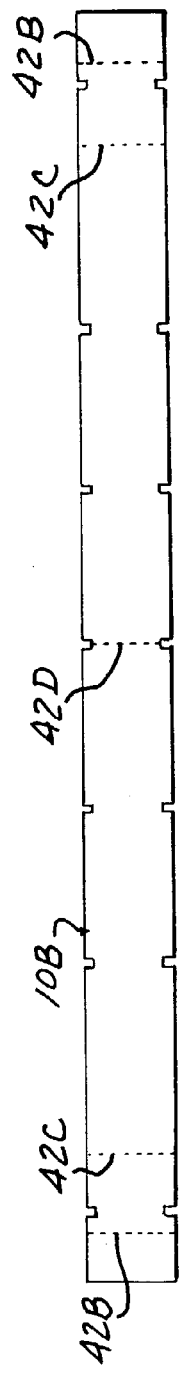
Figure 3C:
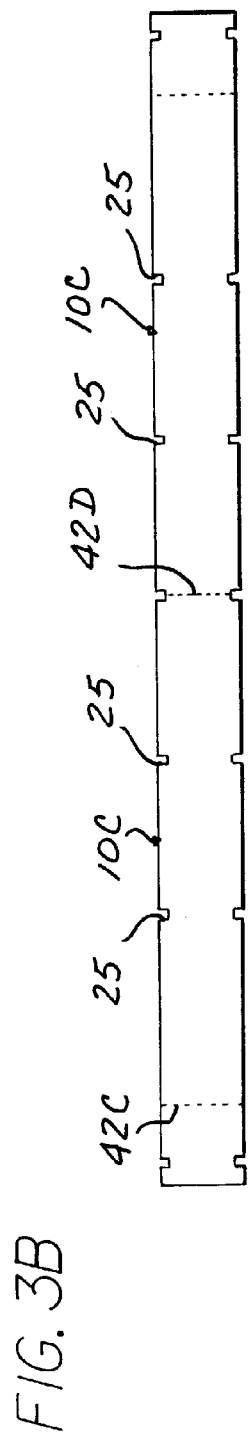
Figure 3D:
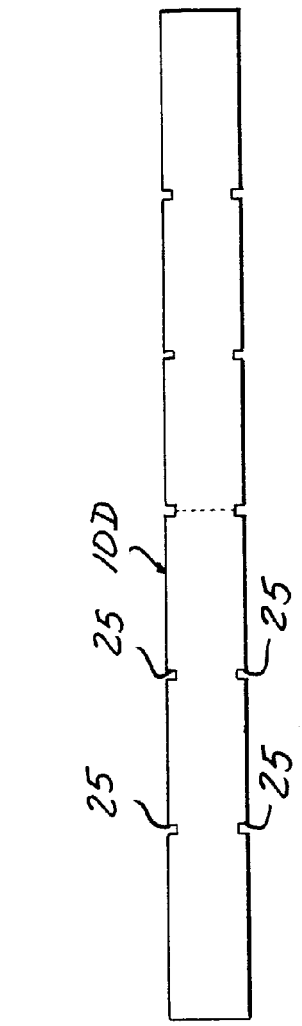

FIG. 2 shows further details. The reflector 14 is preferably constructed generally as described in U.S. Pat. No. 5,613,761, but other reflectors could be used. A backing of corrugated plastic 18 is slit longitudinally on one side to allow ready forming into a trough shape by bending along the corrugation lines.

A reflective film 20 is bonded onto the other side to provide maximum reflection of light emanating from the fluorescent tube 12 to concentrate light directed from the tube in the direction towards the open side of the fixture 10.

Each bracket clip 16 is made from flat plastic sheet stock in a rounded shape having ends 22. A pair of opposing circumferential slots 24 are recessed into the perimeter of each end 22 angled slightly in convergent directions toward each other. The spacing between the two slots 24 is less than the distance between the two side edges 26 of reflector 14 when the reflector lies flat so that the reflector sheet is formed into a trough shape when the side edges 26 are hooked into a respective slot 24 as shown. The reflector 14 has a series of notches 25 cut into its side edges 26. The bracket clips 16 are installed in the notches 25 to locate and secure the same.

A series of spaced apart bracket clips 16 are installed in this way along the length of the reflector 14 to form a complete trough shape along its length.

A central hole 28 is sized to receive the light tube 12, the hole 28 extending into a gap 30 provided to create two resiliently bendable tabs 32 extending partially around said hole. Either of the bendable tabs 32 can be twisted aside to allow the light tube 12 to be passed into the hole 28 so that the light tube 12 need not be removed from the fixture 10 to install the reflector 14.

A knockout 34 is also formed by arcuate slots 36 and scoring 38 to allow use with larger diameter fluorescent light tubes.

FIGS. 3A–3D show how a single reflector blank 40 can be employed to form various lengths reflectors.

A series of the notches 25 are provided sufficient in number to allow two, three or four foot reflectors to be constructed while enabling installation of at least two clip brackets.

A series of imprinted or scored cutting guide lines 42 A, B, C are provided on either end, as well as a center guide line 42D.

Two longer reflectors 10A for four foot strip fixtures can be produced from the uncut blank 40.

By cutting along guide lines 42A a shorter reflector 10B is formed for four foot recessed fixtures.

By cutting along the next guide lines 42B and 42D, a pair of two foot reflectors 10C are provided, each having two aligned pairs of notches 25 for two bracket clips 16.

By cutting along guide lines 42C, a three foot reflector 10D is created with three bracket clips 16 used to form and support the same.

Thus, a simple inexpensive arrangement and method for increasing the useful light output of fluorescent fixtures is provided using the reflector and bracket clips as described, which allows quicker and easier retrofitting of light fixtures in the field.

We claim:

1. A reflector arrangement for a fluorescent light fixture of a type including an elongated fluorescent tube comprising:
   a generally rectangular reflector sheet held in a trough shape by a series of bracket clips;
   said bracket clips each configured as a flat sheet with a rounded contour perimeter edge and having a central hole formed therein sized to slidably receive said fluorescent tube, a slot substantially narrower than said fluorescent tube extending in from said perimeter edge of each bracket clip into said hole to enable fitting of each bracket clip onto said fluorescent tube at an intermediate location along the length thereof, each of said bracket clips further including a pair of peripheral notches extending into said perimeter edge in opposite directions and generally circumferentially with respect to said hole;
   said reflector sheet having opposite edges each received into a respective one of said bracket clip peripheral notches to hold said reflector sheet in a curved trough shape extending partially around said perimeter edge of said bracket; and
   said bracket clips thereby holding said reflector on said fluorescent tube and holding said reflector sheet in said trough shape partially surrounding said fluorescent tube and said bracket clip.

2. The reflector arrangement according to claim 1 wherein said reflector sheet is constructed of corrugated plastic having a reflecting film bonded on one side.

3. The reflector arrangement according to claim 1 wherein said reflector sheet has a series of aligned pairs of notches formed into said side edges, each of said bracket clip notches received in a respective aligned pair of said reflector sheet notches.

4. The reflector arrangement according to claim 1 wherein each of said bracket clips are constructed from clear plastic.

5. The reflector arrangement according to claim 1 wherein each bracket clip is formed with a rounded easily removable at least partially circular knock out portion, said hole formed therein, a slot extending around said knock out portion leaving an easily breakable connecting portion to remaining portions of said clip to allow a larger hole to easily be formed in each bracket clip by breaking said connecting portion and removing said knock out portion, said larger hole sized to receive a fluorescent tube of a larger diameter than said hole within said knock out portion.

6. The reflector arrangement according to claim 1 wherein said slot extending to said hole towards said reflector sheet.

7. The reflector arrangement according to claim 1 wherein said slot extending to said hole in each bracket clips forms two resiliently bendable portions able to be twisted apart in opposite directions to create a gap allowing allow each of said bracket clips to be installed onto said fluorescent tube pass through said gap and into said hole without removal of said fluorescent tube from said fixture.

8. A method of mounting a reflector sheet in a fluorescent light fixture having a light tube installed therein without removing said light tube, comprising forming a plurality of bracket clips each comprised of a flat sheet of plastic having a hole lying within a perimeter edge of said clip and an opposing pair of notches extending into said perimeter edge of each bracket clip, said notches extending in opposite directions and generally parallel to a tangent circumferentially with respect to said hole, so that said notches are able to receive and retain a respective side edge of said reflector sheet with said reflector sheet bent into a curved trough shape; and
   passing the light tube into said central hole formed in each bracket clip through a substantially narrower slot also formed therein extending from said perimeter edge into said hole by bending apart bendable tab portions defining the respective sides of said slot extending into said hole to form a gap larger than the diameter of said tube, and positioning side edges of said reflector in a respective one of said notches of each clip to connect the same thereto, to hold said reflector on said light tube and in said trough shape extending partially around said perimeter edge of each of said clips.

9. A bracket clip for a reflector comprised of a piece of flat sheet material having a pair of notches extending in from a perimeter edge thereof for receiving a reflector sheet, said notches extending in generally opposite directions away from each other; a hole formed in said clip between said notches, said hole sized to receive a fluorescent light tube; and a slot extending from said perimeter edge into said hole from said perimeter edge of said bracket clip at a location between said pair of notches.

10. The bracket clip according to claim 9 wherein said hole is formed in a removable knockout portion of an at least partially round shape to allow formation of a larger size hole by removal of said knockout portion of said bracket clip around said hole.

11. The bracket clip according to claim 9 wherein said sheet material is clear plastic.

12. The bracket clip according to claim 9 wherein said perimeter of said bracket clip is of rounded flattened shape having a protuberance on either end into which a respective one of said pair of notches extends in opposite generally circumferential directions.

* * * * *